United States Patent [19]

Grubbs

[11] Patent Number: 4,614,641

[45] Date of Patent: Sep. 30, 1986

[54] PARALLEL PURIFICATION OF ALUMINA WITH PHYSICAL PRETREATMENT

[75] Inventor: Donald K. Grubbs, Rector, Pa.

[73] Assignee: Aluminum Company of America, Pittsburgh, Pa.

[21] Appl. No.: 746,322

[22] Filed: Jun. 19, 1985

[51] Int. Cl.$^4$ ............................................. C01F 7/06
[52] U.S. Cl. .................................. 423/127; 423/121; 423/131
[58] Field of Search .................... 423/121, 127, 131

[56] References Cited

U.S. PATENT DOCUMENTS

| | | | |
|---|---|---|---|
| 2,375,342 | 5/1945 | Brown | 23/141 |
| 2,375,343 | 5/1945 | Brown | 23/141 |
| 3,401,009 | 9/1968 | Gittos | 23/52 |
| 3,413,087 | 11/1968 | Roberts | 23/143 |
| 3,681,013 | 8/1972 | Fish | 23/143 |
| 3,716,617 | 2/1973 | Oku et al. | 423/121 |
| 3,868,442 | 2/1975 | Fish | 423/121 |
| 4,468,375 | 8/1984 | Misra | 423/122 |

FOREIGN PATENT DOCUMENTS 1092142 5/1984 U.S.S.R. .............................. 423/121

OTHER PUBLICATIONS

Holbrook et al., "Bureau of Mines, RI6280", Bureau of Mines, Washington, D.C., 1963, pp. 1–20.
Chemical Engineering, Oct. 2, 1961, pp. 42–44.
Glastonbury, J. R., Advan. Extr. Met. Proc. Symp., London, 1967, "Kinetics of Gibbsite Extraction", pp. 908–917.

Primary Examiner—H. T. Carter
Attorney, Agent, or Firm—Douglas G. Glantz

[57] ABSTRACT

Disclosed is a process for producing purified alumina from high-silica bauxite including separating alumina-rich ore containing high-silica content into a coarse fraction and a fines fraction; digesting the fines fraction in a sodium aluminate solution at low temperatures; digesting the coarse fraction in a sodium aluminate solution at higher temperatures under pressure; and precipitating out alumina from the digest solutions after the combined liquors are desilicated during clarification.

17 Claims, 1 Drawing Figure

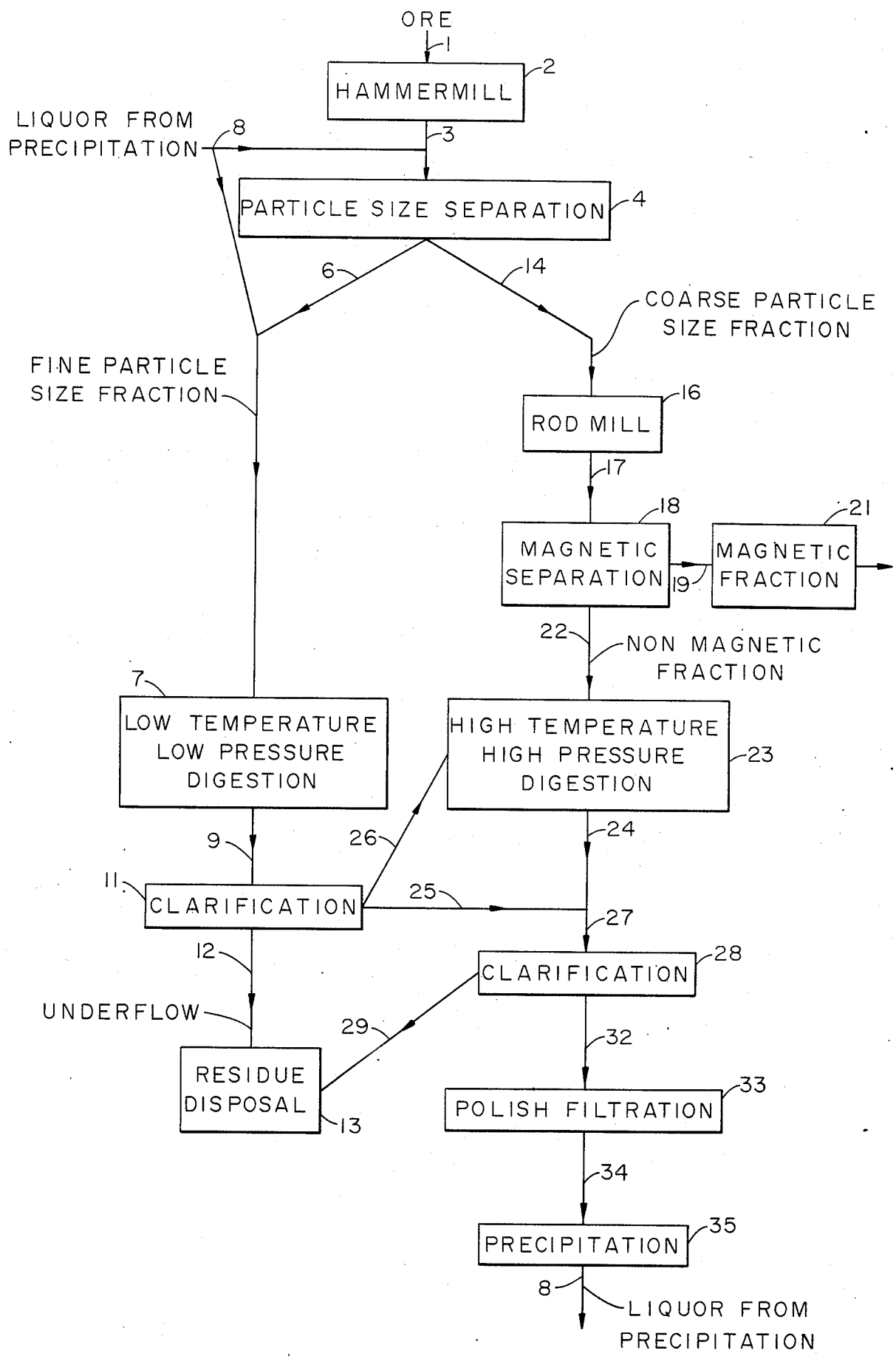

PARALLEL PURIFICATION OF ALUMINA WITH PHYSICAL PRETREATMENT

BACKGROUND OF THE INVENTION

This invention relates to a process for purifying alumina from low-grade alumina-bearing ores, e.g., such as gibbsitic bauxite containing high concentrations of kaolinite. In one aspect, this invention relates to a process combining physical pretreatment and chemical extraction to purify alumina from low-grade bauxite ores.

Low-grade bauxite ores, e.g., such as bauxites containing high concentrations of reactive silica cannot be processed economically by the conventional Bayer process for the reason that high caustic soda losses are incurred by precipitation in the residue. By "high reactive silica content" is meant more than about 5-6% by weight reactive silica in the ore. Conventionally, high reactive silica bauxites are processed domestically by a combination process including a Bayer process of pressurized digestion at 143° C. for 0.5 hr. with the digest residue (red mud) processed by a lime-soda sinter to recover the $Na_2O$ and $Al_2O_3$ fixed in the residue as desilication product (DSP).

Physical beneficiation methods have been investigated previously to lower the silica content of high reactive silica bauxites. However, particle size separation by washing or particle size separation followed by flotation of the fines fraction have been unsuccessful in producing an acceptable Bayer plant feed, because of low available $Al_2O_3$ recovery and/or high reactive silica in the product.

A particle size pretreatment step was described in Fish, U.S. Pat. No. 3,681,013, to provide a process for caustic digestion of bauxite while eliminating non-reactive silica problems encountered in a high-temperature, high-pressure digestion. The Fish process involves separating a coarse fraction from a fines fraction of bauxite prior to digesting the fines according to a conventional high-temperature and high-pressure Bayer process system. Fish discloses that this may be done by a dry or a wet process. Fish discloses the fines fraction can be separated from the coarse fraction while both are dry, or the coarse fraction may be separated from the fines while digesting the bauxite with spent liquor, generally supplemented by additional caustic, at substantially atmospheric pressure to extract alumina from the coarse fraction. Spent liquor is the liquor remaining after precipitation of alumina following the high-temperature, high-pressure digestion. Liquor entering the conventional high-temperature and high-pressure digestion stage is rich in alumina removed from the separated coarse fraction. Fines are introduced to the high-temperature, high-pressure digestion stage either separately or suspended in the liquor which contains alumina extracted from the coarse fraction. In the Fish process, the spent liquor preferably does not contact the fines when the separation of coarse from fines is accomplished as a part of the preliminary low-pressure digestion stage.

The Fish process proposed the particle size separation step after alumina is extracted from the coarse fraction by introducing spent liquor at the opposite end from which the bauxite is introduced to one or more vessels in which the preliminary digestion takes place at substantially atmospheric pressure. The Fish process preferably is operated at a temperature no higher than the atmospheric boiling point, e.g., such as at a temperature in the preliminary digestion stage ranging from about 170° F. to about 230° F.

The Fish patent describes the purification of bauxite containing approximately 40% total $Al_2O_3$ and 28% total $SiO_2$ (only approximately 0.8% reactive $SiO_2$) by preliminary digestion with caustic supplied countercurrently as caustic spent liquor having an alumina to total caustic (expressed as grams per liter sodium carbonate) ratio of about 0.33 from a conventional Bayer precipitation step at substantially atmospheric pressure and a temperature of about 200° F. Extraction from the coarse fraction was substantially complete as confirmed by an analysis of the coarse mud. An overflow stream containing fines fraction ($-40$ mesh) and alumina removed from the coarse fraction at a silica to total caustic ratio of 0.0047 and an alumina to total caustic ratio expressed as grams per liter sodium carbonate of about 0.48. Digestion was continued under conventional high-temperature, high-pressure conditions at a temperature of 290° F. and a pressure at 43 psig until the alumina to total caustic ratio was about 0.63. The resulting sodium aluminate liquor was then flashed back to substantially atmospheric pressure and temperature prior to having the alumina separated therefrom by precipitation by seeding.

Atmospheric pressure digestion of bauxite slurry with caustic at a temperature at or below the boiling point has been recognized as a process for solving the silica problem in low-grade bauxite ores. Such an atmospheric pressure digestion was recognized as prior art in the Background of the Invention in the aforementioned Fish patent. Fish also recognized a prior art process to reduce silica problems by first digesting the bauxite with a sufficient concentration of caustic at a sufficient temperature and pressure to dissolve much of the silica and form a desilication product without dissolving any appreciable amount of alumina and then, without separating the resulting dispersed solids from the resulting liquor, continuing the digestion at the conventional high temperatures and pressures. The difficulty with this procedure is that coarse particles of undigested bauxite or of silica in the form of desilication product will still be present in the unseparated solids. Such a procedure is illustrated in Roberts, U.S. Pat. No. 3,413,087.

The Roberts process involves contacting a thick slurry of fresh comminuted ore with caustic alkali solution, the amount of the solution being insufficient to dissolve all of the soluble alumina but sufficient to dissolve substantially all the silica in the ore, and the slurry is treated to precipitate substantially all the silica present. Then the ore slurry is heated by indirect heat exchange with recovered steam, and the heated slurry is passed to the digestion stage, while the resulting spent liquor containing residual silica is partly recycled to the initial ore preparation stage.

Another prior art process involving a low-pressure, low-temperature digest, e.g., such as at room temperature and atmospheric pressure, is practiced in Africa at Fria, Guinea, with low $SiO_2$ bauxite. The Fria plant operates at a high concentration of caustic, i.e., slurry discharged from rod mills flows into a tank where it is mixed with additional sodium aluminate liquor at 200 grams per liter $Na_2O$. However, such a system involves a considerable amount of dilution in the subsequent alumina hydrate precipitation stage, necessitating a complex evaporation unit if a concentrated caustic is to be reused.

The aforementioned Fish patent, U.S. Pat. No. 3,681,013, recognizes another prior art process involving grinding to reduce silica abrasion problems in which the bauxite is ground to such a fine extent that there is no coarse fraction high in silica. The Fish patent reports that this process has tended to increase rather than decrease difficulties, however, as grinding energy requirements have been greater, clarification of fine mud has required additional equipment, washing has been harder, and there has been additional soda loss.

Various other prior art processes have been proposed for the commercial extraction of alumina from high-silica, alumina-bearing ores involving alternative chemical beneficiation steps. Brown, in U.S. Pat. Nos. 2,375,342 and 2,375,343, proposed a method for recovering alumina from low-grade ores by treating the low-grade ore to solubilize its alumina and to separate dissolved alumina from silica and other unwanted impurities in the ore. Alkaline earth and alkali metal compounds are mixed with ore and then sintered. The function of the alkaline earth compound is to insolubilize silica. Any compound which forms insoluble silicates can be used in the Brown process, but readily available and low-cost limestone is preferred. The amount of limestone to be added depends on the amount of silica in the ore. The sintered mixture is then leached to recover soluble alumina and caustic values. The leach liquor will also contain quantities of solubilized impurities, principally silica. The leaching media may be heated, preferably to temperatures not in excess of 200° F., higher temperatures promoting the formation of insoluble complexes containing alumina. The residue of alkaline earth silicate and insoluble impurities plus alumina is discarded. Leach liquor containing substantial amounts of soluble silica is added to the bauxite-caustic liquor and digested in a conventional Bayer process.

Misra, U.S. Pat. No. 4,468,375, notes that caustic soda reacts with silica minerals present in bauxite, and terms this a "chemical caustic loss" dependent upon the amount of caustic and reactive silica minerals present in the bauxite. Misra notes that the Bayer process alumina product generally contains various inorganic impurities such as silica, and the process efficiency is lowered by such impurities which accumulate in the caustic liquor as it recirculates through the initial step of bauxite digestion in the Bayer process. Misra proposed a process including comminuting aluminum-containing mineral ore; reacting the comminuted ore at an elevated temperature with an aqueous solution of at least 150 grams per liter of sodium bicarbonate to form a solid reaction product of dawsonite and impurities; and converting the dawsonite to alumina. In this way, an aqueous solution of sodium bicarbonate replaces aqueous sodium hydroxide in the initial bauxite digestion.

Oku et al., U.S. Pat. No. 3,716,617, discloses a process for producing alumina according to the Bayer process and separating digestion residue from sodium aluminate slurry. Although ambiguous, Oku refers to a "reactive silica" as silica present as clay and/or any other silicate in an alumina-containing ore. Oku discloses that when the temperature during extraction of an alumina component from bauxite is high, digestion time required may be short but, on the other hand, the rate of dissolution of the reactive silica becomes greater, so the rate of variation of the reactive silica content in the digestion residue becomes quick and the operation becomes difficult. Further, the desilication reaction is accelerated and the alumina and alkali solution are lost. On the other hand, if the digestion temperature is low, the desired high alumina concentration in the sodium aluminate solution cannot be obtained. Therefore, the digestion temperature is usually 90° C. to 150° C., preferably 110° C. to 140° C. The Oku process mixes bauxite containing over about 10% by weight total silica, 8.5% by weight reactive silica, with sodium aluminate solution which apparently is silica-free. The digestion residue is separated from the sodium aluminate solution by a synthetic organic high molecular weight flocculent, the separation being conducted only when at least 5% by weight reactive silica remains in the digestion residue. Soda concentrations higher than 70 grams per liter are disclosed for digestion.

It is an object of the present invention to produce alumina from gibbsite-rich ore containing high silica content.

It is another object of the present invention to recover alumina from low-grade bauxite ores by alumina purification while inhibiting the dissolution of reactive silica in the digestion process.

It is yet another object of the present invention to purify alumina-rich ore containing high amounts of reactive silica while minimizing the loss of soda in the form of desilication product.

These and other objects will become apparent from the disclosure which continues as follows.

SUMMARY OF THE INVENTION

The present invention provides a process for producing purified alumina from high-silica bauxite including separating alumina-rich ore containing high-silica content into a coarse particle size fraction and a fines particle size fraction; digesting said fines fraction in a sodium aluminate solution of higher than about 240 total caustic at a temperature in the range of about 80° C. to about 130° C. to form a first alumina-rich solution; digesting said coarse fraction in a sodium aluminate solution at temperatures in the range of about 130° C. to 150° C. to form a second alumina-rich solution; and precipitating out alumina from said first and second alumina-rich solutions. In one aspect, the two-stage process of the present invention includes feeding the coarse fraction to a pressurized Bayer digestion step. The sodium aluminate solution from the fines digestion step is mixed with the pressurized digestion slurry to desilicate the atmospheric digestion liquor.

BRIEF DESCRIPTION OF THE DRAWING

The Figure depicts a schematic flow diagram of the process of the present invention.

DETAILED DESCRIPTION

Referring to the Figure, low-grade bauxite ore containing high amounts of reactive silica is fed at 1 to hammermill 2 where the ore is ground to lumps sized less than about 1 inch. Ground ore is passed at 3 to particle size separation unit 4 provided by screens and cyclones. Fines fraction having a particle size of about −150 mesh (Tyler Series) is fed in line 6 to a low-temperature digestion unit 7 having a feed of caustic liquor in line 8.

The particular particle size at which the fractions are split in separation unit 4 can vary. Separation at a larger, i.e., more coarse, particle size will decrease the reactive $SiO_2$ (kaolinite) in the fines fraction, increase the available $Al_2O_3$ in the fines fraction, and also increase the siderite ($FeCO_3$) in the fines fraction. Larger particle size in the fines fraction will increase the weight percentage of the fines fraction compared to the coarse fraction, and more of the bauxite will be fed to low-temperature digestion.

The low-temperature digestion preferably is performed at temperatures up to the boiling point temperature of the slurry at atmospheric pressure to provide a temperature in the range of about 80° C.–120° C. Such an atmospheric pressure digestion is preferred, but the process can be performed under higher pressures at lower efficiencies.

The digestion solution in low-temperature digestion unit 7 has a high silica concentration in the process of the present invention. The low-temperature digestion preferably is carried out as a continuous process, e.g., such as in a back-mixed digestion vessel.

The caustic and silica digestion solution in unit 7 also should contain a high dissolved alumina concentration. The caustic concentration should be more than about 240 g/L expressed on a sodium carbonate basis. The silica in the resultant digestion solution in digestion unit 7 should be more than about 1.8 g/L. The alumina in this same digestion solution should be near saturation for a given caustic concentration. In the low-temperature digestion step performed at 7, alumina is dissolved at a high rate while inhibiting the dissolution of reactive silica (kaolinite) from the fines fraction ore.

Digest solution and residue exiting from the low-temperture digestion unit 7 are passed in 9 to clarifier 11. The underflow from the clarifier after residue washing is passed in line 12 to residue disposal 13.

The coarse fraction from the particle size separation unit 4 containing ground ore sized above about 150 mesh (Tyler Series) or coarse in particle size is sent in line 14 to rod mill 16 where the coarse fraction is ground to a smaller particle size, e.g., of about −60 mesh (Tyler Series) which is passed in line 17 to magnetic separation unit 18. Magnetic separation at 18 provides a magnetic fraction high in iron content which is passed in line 19 to magnetic fraction holding station 21 and then to residue disposal unit 13.

The non-magnetic fraction having most iron impurities such as siderite ($FeCO_3$) removed is passed in line 22 to pressure digestion unit 23 which is carried out at higher temperatures and pressures consistent with presurized Bayer process practice.

Digest liquor and residue are sent in line 24 to join the overflow in line 25 from clarifier 11. The mixture of this liquor with residue containing desilication product promotes liquor desilication during clarification in line 28. The combination liquor is sent in line 27 to clarifier 28.

Optionally the overflow from clarifier 11 can be fed in line 26 to pressure digestion 23 and desilication made to occur there. In this case, pressure digestion preferably is carried out at a higher temperature than when the high silica overflow from clarifier 11 is joined with residue in line 24. Otherwise, desilication would be reduced in pressure digestion unit 23. By way of example, pressure digestion in unit 23 with high silica fed in line 26 preferably is performed at about 143° C. or higher at a contact time sufficient to provide adequate desilication, e.g., for about one-half hour. By adequate desilication is meant desilication sufficient to provide a low silica liquor for alumina precipitation as in a conventional Bayer process for gibbsitic ores. Residue from the clarifier after washing is sent in line 29 to residue disposal 31. Overflow from the clarifier in line 32 is sent to polish filtration step 33 and then is passed in line 34 to precipitation step 35 where aluminum hydrate is precipitated from solution.

The process of the present invention provides an alumina ($Al_2O_3$) extraction which is essentially complete at all digestion temperatures. Silica dissolution, however, proceeds more slowly and is strongly influenced by digestion temperatures as shown by digestion of an 18.4% reactive $SiO_2$ bauxite. For 10 minutes' contact time at 105° C., only 8.8% of the total silica was dissolved. For the same contact time at 130° C., 27.9% of the total silica was dissolved, and 51.9% of the total silica was dissolved at 143° C. The rate of silica dissolution decreases after 30 minutes' contact time at all temperatures. The $Na_2O$ content of the residue is very low (0.1%) at 105° C. at 10 minutes' contact time. However, silica in the liquor increases from 0.32 to about 1.53 grams/liter with 10 minutes' digestion time. The liquor is undersaturated with respect to silica and thus desilication product does not precipitate into the residue. With 20 minutes' contact time, liquor silica increases to 2.21 grams/liter, and therefore the liquor is supersaturated with silica. The supersaturation of Bayer liquor with respect to silica triggers the precipitation of desilication product (DSP). From 30 to 60 minutes' elapsed run time, the $Na_2O$ in the residue gradually increases from 0.2 to 3.73% as DSP begins to precipitate from the liquor. The silica in the liquor, however, remains near 2.0 grams/liter since the rate of DSP formation is inversely proportional to the temperature of Bayer liquor. The digestion at 105° C. in the liquor nearly saturated with silica suppresses the dissolution of silica from kaolinite and lowers the rate of precipitation of desilication product as the kinetics of dissolution and precipitation are very low at this temperature. Increasing digestion temperatures above about 104° C.–111° C. increases silica dissolution, promotes desilication product formation, and consequently increases fixed soda losses without obtaining significantly higher alumina extraction. Therefore, digestion at low temperatures for short contact times provides lower soda losses resulting from suppressed kaolinite dissolution and reduced desilication product formation at the preferred digestion conditions of the process of the present invention.

The process of the present invention is based on the difference between the rates of dissolution of gibbsite and kaolinite as a function of temperature and bauxite-residence contact time. The rate of kaolinite dissolution at constant temperature and time is affected by the rate of desilication product precipitation. In the absence of desilication product seed at temperatures below about 130° C. and bauxite-residence contact times less than about 0.5 hour, silica remains in the liquor rather than precipitating as DSP. The addition of DSP seed will promote liquor desilication at these conditions. At low-temperature digestion conditions, silica solubility increases with caustic concentration, but the rate of desilication product formation decreases with increasing caustic concentration. For this reason, the net amount of kaolinite dissolution decreases with increasing caustic concentration.

The present process reduces the amount of silica dissolution from kaolinite. The present process converts a high reactive silica bauxite to a low-reactive silica bauxite and reduces the amount of fixed soda losses by digestion at lower temperatures and shorter contact times than the conventional low-temperature Bayer process. Fixed soda losses can be reduced by about 60% by processing the high-silica, fine particle size fraction at low-temperature digestions and the low-silica, coarse particle size fraction at high-temperature Bayer process pressurized digestion. The low-temperature digestion can be carried out in the range of about 80° C.–150° C., preferably at temperatures in the range of about 90° C.–130° C., more preferably in the range of about 100° C.–120° C., and in a narrower range of about 104° C.–111° C.

The mechanism of the process of the present invention can be explained by the direct relationship of silica dissolution to digestion temperature, bauxite-residue contact time, and the amount of desilication product seed in the digestion slurry. Further, the silica dissolution from kaolinite at continuous atmospheric digestion conditions is inversely related to the concentration of silica and alumina in the digest liquor and the total caustic concentration.

Complete alumina extraction from gibbsite is obtained from low residence time, e.g., less than about 0.5 hour and preferably less than about 0.33 hour at low temperatures of the process as indicated above during the digestion of fine particle size bauxite, e.g., less than about $-150$ mesh (Tyler Series). Digestion yield of alumina can be increased to greater than about 50 grams/liter by the low-temperature digestion in a high-caustic digestion solution, e.g., such as greater than about 240 grams/liter total caustic on a sodium carbonate basis without increasing total silica dissolution.

Fixed soda losses in the low-temperature digestion overflow series ranged from 0.05 to 0.06 TNaOH/TAl$_2$O$_3$ for 30% available alumina bauxite and 0.035 to 0.04 TNaOH/TAl$_2$O$_3$ for 40% available alumina bauxite which contain 13% SiO$_2$.

It has been found that most of the siderite, e.g., up to as much as 90% of the siderite, is concentrated in the coarse particle size fraction in the range of about 2.5 centimeters to 150 mesh (Tyler Series). The siderite can be removed from the coarse fraction after grinding to $-60$ mesh (Tyler Series) by a wet, high-intensity magnetic separation and thus the amount of lime needed for caustic digestion is reduced. Siderite so removed in the magnetic separation can be as high as about 70–80% by weight of the total siderite.

In the low-temperature digestion step of the process of the present invention, a higher total caustic in the feed provides more silica in solution. At a high-pressure digestion, such a higher total caustic would give more desilication product. At the lower temperature, however, it has been found that the reaction rate of silica in solution to form desilication product is lower than at pressurized digestion, and also the rate of dissolution is lower than at pressurized digestion. For this reason, the digestion solution during low-temperature digestion should contain a high-silica, high-caustic, high-alumina content. Otherwise, in the absence of high-alumina concentration, the silica would react to form more desilication product. With high-silica, high-alumina, high-caustic concentrations, very little silica reacts to form desilication product. It has been found that alumina extraction is not retarded by the lower temperatures. The rate of gibbsite dissolution is much greater than kaolinite dissolution.

In one aspect, the process of the present invention is carried out on a continuous basis. A continuous process is preferred for the reason that progressive dissolution in a back-mixed digestion vessel maintains a digestion solution nearly saturated with alumina and silica which suppresses kaolinite dissolution.

While the invention has been described in terms of preferred embodiments, the claims appended hereto are intended to encompass all embodiments which fall within the spirit of the invention.

What is claimed is:

1. A process for producing alumina from high-silica bauxite containing more than about 5% reactive silica comprising:
   (a) separating said bauxite into a coarse fraction of particle size larger than about 150 mesh and a fines fraction of particle size smaller than about 150 mesh (Tyler Series);
   (b) digesting said fines fraction in a sodium aluminate solution having a caustic concentration higher than about 240 total caustic on a sodium carbonate basis at a temperature in the range of about 80° C. to about 130° C. to form a first alumina-rich solution;
   (c) digesting said coarse fraction in a sodium aluminate solution at temperatures in the range of about 140° C. to 150° C. to form a slurry of a second alumina-rich solution and desilication product (DSP) containing residue;
   (d) mixing said first alumina-rich solution and said slurry to desilicate said first solution in contact with said DSP containing residue and to form a combined liquor; and
   (e) precipitating out alumina from said combined liquor.

2. A process as set forth in claim 1 wherein said fines fraction is digested at a temperature in the range of about 90° C.–120° C.

3. A process as set forth in claim 2 wherein said fines fraction is digested at a temperature in the range of about 100° C.–120° C.

4. A process as set forth in claim 3 wherein said reactive silica comprises more than about 6% by weight of the bauxite.

5. A process as set forth in claim 4 wherein said fines fraction is digested in a sodium aluminate solution having a silica concentration higher than about 1.8 g/L.

6. A process as set forth in claim 5 wherein said sodium aluminate solution for digesting the fines fraction is nearly saturated in silica and alumina.

7. A process as set forth in claim 5 wherein said sodium aluminate solution for digesting fines fractions comprises a first sodium aluminate solution containing alumina having a concentration slightly less than saturation for a given caustic concentration.

8. A process as set forth in claim 6 wherein said process is carried out continuously in a back-mixed digestion vessel.

9. A process as set forth in claim 8 wherein said low-temperature digestion is carried out at a temperature in the range of about 104° C.–111° C.

10. A process as set forth in claim 9 further comprising removing dissolved silica by seeding the spent liquor from the precipitating alumina step with residue containing desilication product.

11. A two-stage process for extracting alumina from a bauxite containing more than about 6% reactive silica comprising:
   (a) grinding and separating the high reactive silica-containing bauxite to form a coarse fraction above 150 mesh (Tyler Series) having a low reactive silica content and a fines fraction below 150 mesh having a high reactive silica content;
   (b) digesting the fines fraction in a low-temperature Bayer process at a temperature in the range of about 80° C.-130° C. to form a first solution high in sodium aluminate while inhibiting the dissolution of silica from the bauxite;

(c) feeding the coarse fraction from step (a) in the sodium aluinate solution to a pressurized Bayer process digestion step in the range of 130° C.-150° C. to form a slurry of a second alumina-rich solution and desilication product (DSP) contanining residue;

(d) mixing said first alumina-rich solution and said slurry to desilicate said first solution in contact with said DSP containing residue and to form a combined liquor; and (e) precipitating out alumina from the combined liquor.

12. A process as set forth in claim 11 wherein said atmospheric pressure, low-temperature digestion is carried out at a mean residence time of from about 0.17 to about 0.67 hour preferably at 0.22 hour or less.

13. A process as set forth in claim 12 wherein said pressure digestion is carried out at a mean residence time of about 0.08 to about 0.25 hour at 130° C. or 0.5 hour at 143° C.

14. A process as set forth in claim 13 wherein said first sodium aluminate digestion solution contains a concentration of silica higher than about 1.8 g/L.

15. A process as set forth in claim 14 wherein said first sodium aluminate digestion solution contains alumina slightly below the saturation level for a given caustic concentration and temperature.

16. A process as set forth in claim 15 further comprising removing dissolved silica by seeding with residue containing desilication product.

17. A two-stage process for extracting alumina from alumina-containing ores having more than about 6% reactive silica content comprising:

(a) grinding and separating the ore to form a coarse fraction having a particle size larger than about 150 mesh (Tyler Series). having a low reactive silica content and a fines fraction of lower particle size than 150 mesh (Tyler Series), having a high reactive silica content;

(b) digesting the fines fraction in an atmosperic Bayer process at a temperature in the range of about 105° C.-111° C. for about 0.17 to about 0.33 hour mean residence time to form a first solution high in sodium aluminate while inhibiting the dissolution of silica from kaolinite;

(c) feeding the coarse fraction from step (a) in the sodium aluminate solution from step (b) to a pressurized digester at about 130° C.-145° C. for about 0.08-0.05 hour mean residence time to form a slurry of a second alumina-rich solution and desilication product (DSP) containing residue;

(d) mixing said first alumina-rich solution and said slurry to desilicate said first solution in contact with said DSP containing residue and to form a combined liquor; and (e) precipitating out alumina from the combined liquor.

* * * * *

UNITED STATES PATENT AND TRADEMARK OFFICE
CERTIFICATE OF CORRECTION

PATENT NO. : 4,614,641

DATED : September 30, 1986

INVENTOR(S) : Donald K. Grubbs

It is certified that error appears in the above-identified patent and that said Letters Patent is hereby corrected as shown below:

Claim 17, Col. 10, line 9      After "(Tyler Series)" change the period to a comma.

Claim 17, Col. 10, line 22      Change "0.08-0.05" to --0.08-0.5--.

Signed and Sealed this

Sixteenth Day of December, 1986

*Attest:*

DONALD J. QUIGG

*Attesting Officer*      *Commissioner of Patents and Trademarks*